(12) United States Patent
Mowry et al.

(10) Patent No.: US 6,173,026 B1
(45) Date of Patent: Jan. 9, 2001

(54) SYSTEM FOR MONITORING REACTOR INSTABILITY AND CONTROLLING REACTOR SUPPRESSION

(75) Inventors: Christofer M. Mowry, Morgan Hill; Israel Nir, Saratoga, both of CA (US)

(73) Assignee: General Electric Company, Schenectady, NY (US)

( * ) Notice: Under 35 U.S.C. 154(b), the term of this patent shall be extended for 0 days.

(21) Appl. No.: 09/255,623

(22) Filed: Feb. 22, 1999

Related U.S. Application Data
(60) Provisional application No. 60/076,239, filed on Feb. 27, 1998.

(51) Int. Cl.$^7$ .................................................. G21C 17/108
(52) U.S. Cl. ............................................. 376/254; 376/259
(58) Field of Search .................................. 376/215, 216, 376/217, 238, 241, 254, 255, 259

(56) References Cited

U.S. PATENT DOCUMENTS

| | | | |
|---|---|---|---|
| 4,770,843 | * | 9/1988 | Taleyarkhan ........................... 376/216 |
| 5,174,946 | * | 12/1992 | Watford et al. ........................ 376/216 |
| 5,225,149 | * | 7/1993 | Banda .................................... 376/255 |
| 5,481,575 | * | 1/1996 | Bäck et al. ............................. 376/254 |
| 5,524,128 | * | 6/1996 | Mowry et al. ......................... 376/236 |
| 5,555,279 | * | 9/1996 | Nir et al. ............................... 376/216 |

* cited by examiner

Primary Examiner—Charles T. Jordan
Assistant Examiner—Kyongtaek K. Mun
(74) Attorney, Agent, or Firm—Armstrong Teasdale LLP

(57) ABSTRACT

A power oscillation monitoring system and method for indicating instability of a nuclear reactor. The monitoring system facilitates monitoring reactor instability and maintaining a nuclear reactor in the stable state. In one embodiment, the monitoring system is implemented in a computer workstation having memory and a processor. The workstation is electrically coupled to neutron detectors, and a period based algorithm and a confirmation density algorithm are stored in the workstation memory. The processor contains a Period Based Algorithm (PBA) and a Confirmation Density Algorithm (CDA). Under the control of the system the PBA algorithm evaluates the periodicity of the neutron detector output signals to identify the presence of density waves in the reactor. The CDA utilizes the PBA output signals to identify confirmation density, which is the fraction of active neutron detectors in the core that reach a target successive oscillation period confirmation count. When the confirmation density exceeds an instability threshold setpoint, an instability signal is generated to facilitate suppression of the reactor prior to any growth in power oscillation amplitude. By providing suppression at these conditions, the development of significant power oscillations is avoided.

18 Claims, 3 Drawing Sheets

SYSTEM FOR MONITORING REACTOR INSTABILITY AND CONTROLLING REACTOR SUPPRESSION

CROSS-REFERENCE TO RELATED APPLICATIONS

This application claims the benefit of U.S. Provisional application No. 60/076,239, filed Feb. 27, 1998.

BACKGROUND OF THE INVENTION

This invention relates generally to nuclear reactors and more particularly, to a system for monitoring reactor instability and controlling reactor suppression.

In known types of nuclear reactors, such as boiling water reactors (BWR), the reactor core includes a plurality of fuel bundles arranged in an array capable of self-sustained nuclear fission reaction. The core is contained in a reactor pressure vessel (RPV). The typical core is submerged in a liquid such as water, which serves as both a core coolant and a neutron moderator. Each fuel assembly includes a flow channel through which water is pumped upwardly from a lower plenum to an upper plenum. A plurality of control rods containing neutron absorbing material are insertable between the fuel bundles to control the reactivity of the core. To monitor core conditions, it is common practice to distribute neutron detectors both radially and axially throughout the core. The signals from these neutron detectors are utilized to monitor the power density of the core and to initiate corrective actions, including reactor suppression, in the event of detected instability.

A nuclear reactor operates under three distinctly different stability regimes. These regimes are a stable reactor state, a reactor instability threshold state and an unstable reactor state. Reactor instability occurs when fuel cladding heat flux and channel coolant flow rates deviate from steady state conditions during power oscillations significantly above the normal neutron noise level. Reactor instability must be monitored to prevent damage to the core and to within fuel safety limits and can be accomplished by either detecting and suppressing instability induced power oscillations, or preventing them altogether.

Known "detect and suppress" systems are based on a common approach. Generally, neutron detectors, for example, local power range monitors (LPRMs), are placed within the core of the reactor. The neutron detectors generate signals indicative of reactor thermal-hydraulic oscillation frequencies. These signals are characteristic of power oscillations of the reactor. Some known "detect and suppress" systems monitor successive oscillation periods and provide a final oscillation amplitude trigger to generate a reactor trip signal. Another known system monitors of an oscillation growth rate limit and if the limit is exceeded, the system generates a reactor trip. Yet another known system compares the neutron detector signal to an amplitude trip setpoint and if the setpoint is exceeded, a reactor trip signal is generated.

Although the known systems generally provide satisfactory results, such systems permit the development of significant power oscillations prior to actuation of the suppression function. As a result, rigorous analysis of minimum critical power ratio (MCPR) performance in the presence of core power and flow oscillations is necessary to prevent exceeding the fuel safety limits or damaging the core. In particular, the transient thermal-hydraulic behavior within the limiting fuel bundle must be related to neutron flux oscillations observed by various neutron detectors.

Another shortcoming of known systems is the potential spatial effects related to the oscillation mode and its impact on the magnitude of the oscillation as observed by any given neutron detector. Combinations of neutron detector signals must be related to a reactor trip setpoint for each of the detection methods. As a result, the known systems are time consuming to determine the appropriate trip levels and allow significant power oscillations to occur prior to suppression. Additionally, current "detect and suppress" systems are still evolving since the quantification of MCPR performance as a function of power oscillation scenarios for the full spectrum of core designs and operating conditions is extremely challenging.

It would be desirable to provide a system that, prior to the development of significant power oscillations, facilitates suppression of the nuclear reactor upon reaching the threshold of reactor instability.

BRIEF SUMMARY OF THE INVENTION

These and other objects are attained by a power oscillation monitoring system which, in one embodiment, facilitates monitoring a nuclear reactor for instability and generates a thermal-hydraulic instability signal facilitating reaction suppression. The present system discriminates instability threshold conditions from stable reactor operation. Particularly, at the threshold of reactor instability, a qualitative change in the reactor core neutronic/thermal-hydraulic response occurs, and the reactor realigns into a strongly coupled configuration, resulting in an increasingly coherent response. This change affects increasingly larger regions of the core and a number density of neutron detectors located in the core reach or exceed a target successive oscillation period confirmation count. Upon the number density exceeding a defined level, an instability signal is generated by the system. By monitoring the neutron detector output signals, the system can reliably and efficiently detect the transition to a coherent core response, which is characteristic of the reactor at the threshold of instability.

In one form, the monitoring system is implemented in a computer workstation having a memory and a processor. The workstation is electrically coupled to neutron flux detectors, and a Period Based Algorithm (PBA) and a Confirmation Density Algorithm (CDA) are stored in the workstation memory. Under the control of the PBA algorithm, the system evaluates the periodicity of the neutron detector output signals to identify the presence of a density wave in the reactor. During stable reactor operation, the system occasionally generates a successive power oscillation period confirmations as a result of global perturbations to the steady state neutron flux.

The CDA utilizes the PBA output signals to identify a confirmation density, which is the fraction of active neutron detectors in the core that reach a target successive oscillation period confirmation count. When the confirmation density exceeds an instability threshold setpoint, the instability signal generated by the CDA changes from a first state to a second state. Following recognition of this condition, the system provides protection of a fuel thermal safety limit by generating the instability signal prior to any growth in power oscillation amplitude. The instability signal facilitates use of the control rods to maintain the stability of the reactor. By providing suppression at these conditions, the development of significant power oscillations is avoided.

The above described system facilitates maintaining a nuclear reactor in the stable state. The system avoids the characterization of MCPR performance as a function of growing power oscillations based on local neutron noise characteristics sensed by a few of the neutron detectors. In addition, the system eliminates the generation of spurious instability signals based on the thermal-hydraulic behavior of the reactor.

The above-described system monitors the nuclear reactor for instability and facilitates suppression of the reactor prior to development of significant power oscillations. In addition, the system does not require rigorous analysis of MCPR performance.

DETAILED DESCRIPTION OF THE INVENTION

Figure 1:
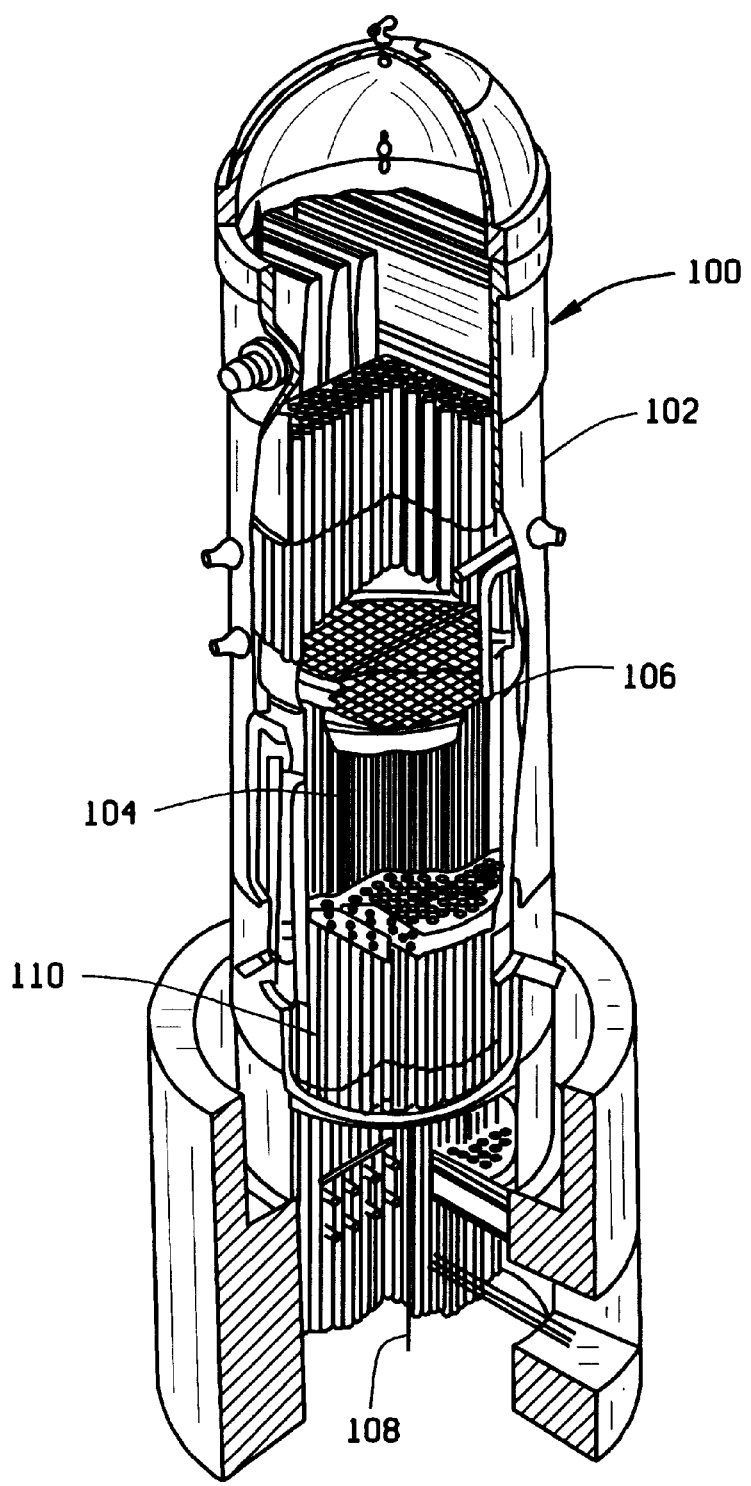
FIG. 1 is a schematic of a boiling water nuclear reactor as applicable to the present invention.

FIG. 1 is a schematic, partial cross-sectional view of a boiling water reactor 100 including a reactor pressure vessel (RPV) 102 and a plurality of fuel bundles 104. RPV 102 is filled with a coolant (not shown), typically water, to a level above core 106. The coolant is circulated through core 106 by a circulation pump (not shown) which forces the coolant upward through fuel bundles 104 of reactor core 106. The heat produced by the nuclear reaction of the fuel is transferred to the coolant such that steam is collected in the upper portion of the RPV 100.

To monitor the core conditions, it is common practice to distribute neutron detectors 108 both radially and axially throughout core 106. Each neutron detector 108 has an output signal which is electrically routed to a monitoring system (not shown). The output signals are used by the monitoring system to determine a confirmation density and to initiate corrective actions, including generating an instability signal, in the event of detected reactor instability. A plurality of control rods 110 containing neutron absorbing material are insertable between fuel bundles 104 to control the reactivity of core 106.

Figure 2:
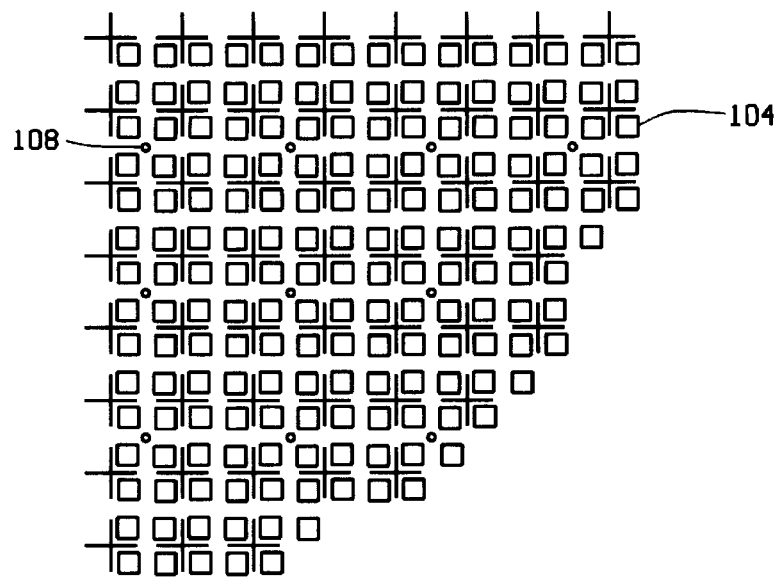
FIG. 2 is a section plan view of a nuclear reactor fuel core as employed in the reactor of FIG. 1.
Figure 3:
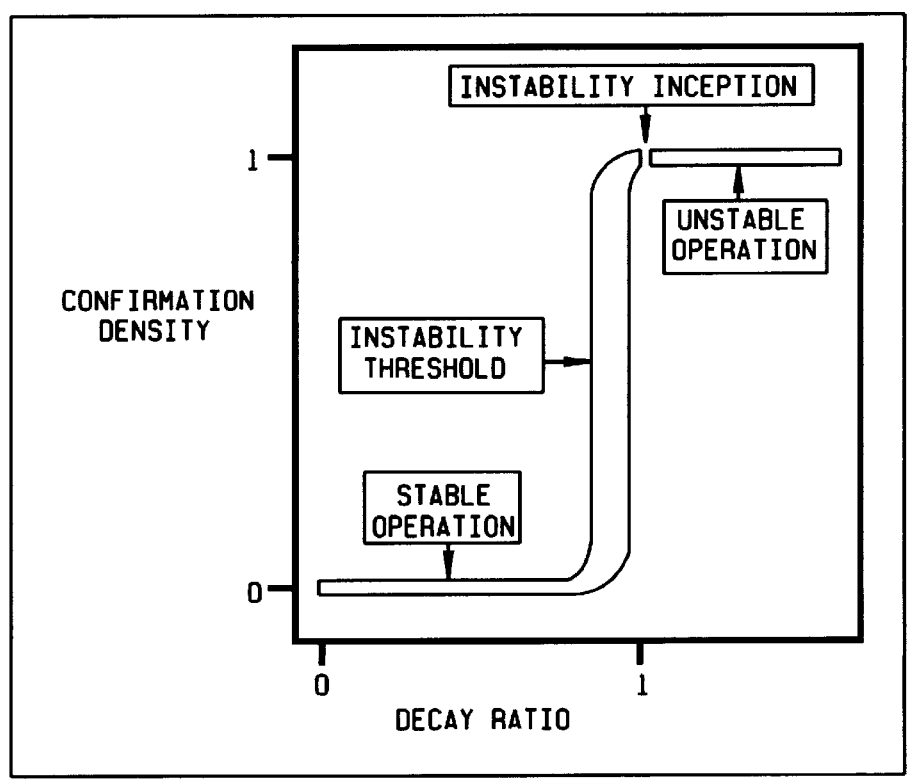
FIG. 3 is a graphical representation of the theoretical confirmation density as a function of decay ratio.

FIG. 2 is a section plan view of fuel bundles 104 within reactor core 106. Neutron detectors 108, such as local power range monitors (LPRMs), are present for detection of neutron flux within core 106. Output signals of neutron detectors 108 are coupled to the monitoring system for determination of instability.

The monitoring system generates the instability signal upon sensing the threshold of coupled neutronic thermal-hydraulic instability. In one form, the monitoring system is implemented in a processor based system having memory and a processor. In one embodiment, the processor based system is a computer workstation, however, the system could perform equally as well on a personal computer, a microcomputer, a digital signal processor, a microcontroller, or other types of programmable circuits. The workstation computer is electrically coupled to neutron flux detectors 108, and a Period Based Algorithm (PBA) and a Confirmation Density Algorithm (CDA) are stored in the workstation memory. The PBA is designed to recognize periodic oscillatory behavior in neutron detector 108 output signals. The CDA identifies the confirmation density, which is a number of active neutron detectors 108 in core 106 that reach a target successive oscillation period confirmation count divided by the number of active neutron detectors 108. When the confirmation density exceeds an instability threshold setpoint, the instability signal is generated.

The mean free path of neutrons in highly voided core regions is comparable to the spacing between adjacent neutron detectors 108. Therefore, during regional mode oscillations, many neutron detectors 108 in the top of core 106, for example, D level neutron detectors 108, can exhibit oscillatory behavior that is caused by the superposition of neutron flux originating from areas of core 106 on both sides of an oscillation symmetry axis. This composite signal can cause poor performance of the PBA in discriminating the successive confirmation counts.

A certain number of neutron detectors 108 become inoperable during the course of an operating cycle. The total number of neutron detectors 108, M, utilized by the PBA is based on a count of active neutron detectors 108 only. Therefore, inoperable neutron detectors 108 are implicitly addressed by the CDA.

The CDA utilizes an instability threshold confirmation count ($\overline{N}_{th}$) to discriminate the stability implications of individual neutron detector successive confirmation counts generated by the PBA. The choice of $\overline{N}_{th}$ is based on two considerations. First, the instability threshold confirmation count must be large enough that core behavior consistent with stable reactor operation is discriminated, and does not result in inadvertent CDA actuation. Several events and processes that occur during the course of stable reactor operations can generate transient perturbations in the steady state flux. These perturbations decay in time, consistent with the stability of reactor 100. Depending on the frequency of reactor response, the PBA can recognize successive oscillation period confirmations in the stable reactor response signature. Based on a conservative estimate of reactor stability during normal operation, an expected maximum successive confirmation count associated with such events during stable reactor operation is determined. Second, $\overline{N}_{th}$ must be low enough that the CDA generates the instability signal near the inception of reactor instability. The MCPR safety limit is protected by the CDA generating an instability signal prior to any significant amplitude growth of power oscillations in the unstable reactor regime.

As reactor 100 reaches the instability threshold, both the successive confirmation counts of individual neutron detectors 108 and the number of neutron detectors 108 generating multiple successive confirmation counts grow in an accelerated manner. A direct result of these qualitative changes in the core response at the instability threshold is a non-linear increase in a number density of neutron detectors 108 reaching the instability threshold confirmation count. The number density, which is the number of active neutron detectors 108 that exhibit an oscillatory response at or above the instability threshold confirmation count divided by the number of active neutron detectors 108, is defined to be a confirmation density.

Figure 4:
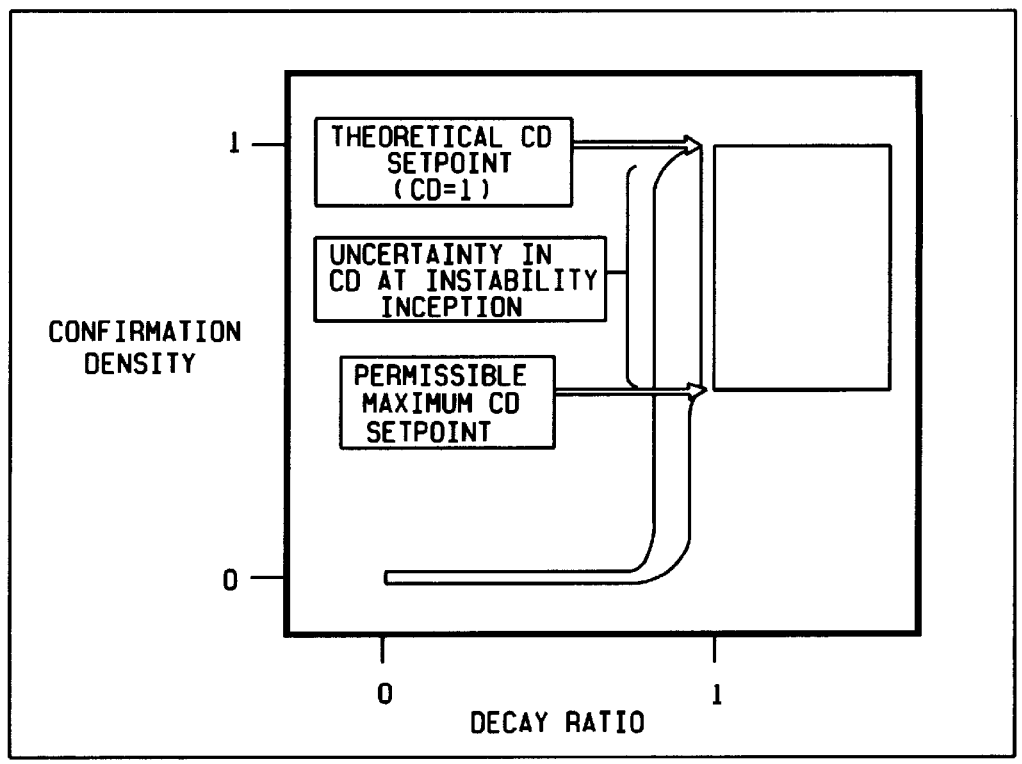
FIG. 4 is a graphical representation of the confirmation density as a function of decay ratio.

FIG. 4 demonstrates the utility of the confirmation density approach to providing automatic protection of the fuel safety limits from reactor 100 instability. During stable reactor operations individual neutron detector 108 confirmation counts do not reach the instability threshold confirmation count, and therefore the confirmation density remains at zero. However, as soon as the instability threshold is approached, the confirmation density rapidly increases. This bi-stable characteristic of the confirmation density, where the value remains at zero except at instability threshold when it rapidly transitions to unity, provides excellent discrimination between stable and unstable operations. As a result, the CDA avoids spurious trips, but also generates instability signal before significant oscillations can develop.

Some of the active neutron detectors 108 can exhibit oscillation signatures incompatible with the PBA due to interference from neutron flux originating from areas of core 106 that are oscillating out-of-phase. This effect is particularly prominent near an axis of symmetry during first order regional mode oscillations. As a result, a maximum confirmation density that is achievable in practice is less than one, as illustrated in FIG. 4.

Implementation of the confirmation density algorithm requires the determination of a confirmation density setpoint ($S_{CD}$) and the instability threshold confirmation count ($\overline{N}_{th}$). The CDA uses the confirmation density setpoint as a point of instability inception. Based on a confirmation density model, instability threshold conditions exist for a finite time before instability inception occurs. The qualitative differences between stable reactor conditions and conditions at the instability threshold are reflected in the strongly bi-stable behavior of the confirmation density as a function of the decay ratio, and make discrimination of the instability threshold straightforward. As a result, the CDA can protect the MCPR safety limits by appropriate selection of a reactor trip setpoint based on a conservative number of neutron detectors 108 that are indicating instability threshold conditions, rather than attempting to precisely identify the condition of instability inception. Because of the availability of a large number of neutron detectors 108 for use by the CDA, a bounding approach is taken to establishing an appropriate upper bound for the CDA trip setpoint.

Figure 5:
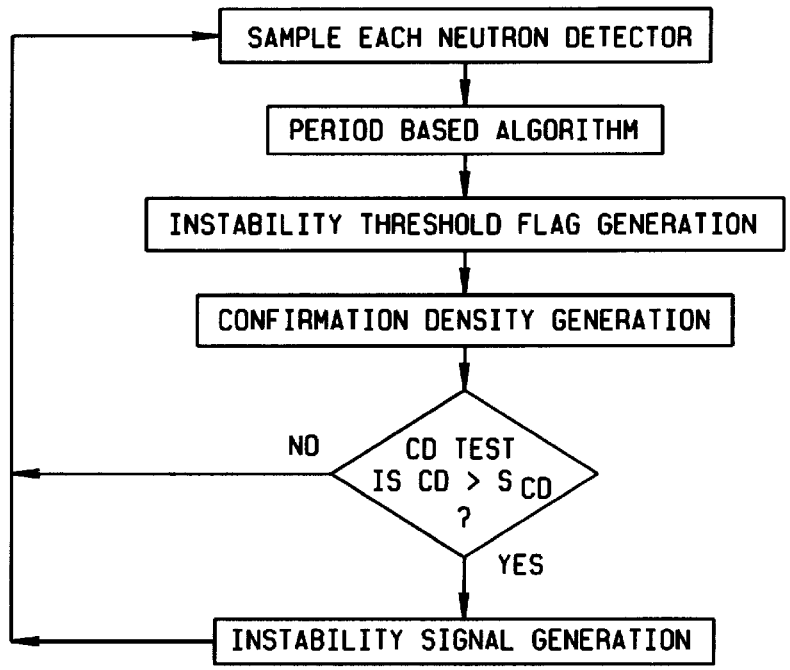
FIG. 5 is a flowchart of present system.

As shown in FIG. 5, the monitoring system includes sampling the neutron detectors, performing PBA, instability threshold flag generation, confirmation density generation, and an instability test. Neutron detector 108 output signals are interrogated at periodic intervals. Output signals are utilized to monitor the power density of core 106 and are provided as an input to the PBA. The PBA is tuned based on a Successive Confirmation Count Model (SCCM), as described in U.S. Pat. No. 5,555,279. Core 106 stability is measured by Decay Ratio (DR) as related to the successive confirmation count of each neutron detector 108 output signal ($N_i$) by:

$$DR = R^{\frac{2}{N_i+2}} \tag{1}$$

The successive confirmation count model can be used to define the instability threshold confirmation count ($\overline{N}_{th}$) for a single neutron detector 108 that is representative of local reactor stability performance at the threshold of instability. Equation 1 requires that, in the limit, $\overline{N}_{th} \to \infty$ as $DR \to 1$. To meet the requirement of generating the instability signal during instability threshold, the instability threshold confirmation count is chosen based on the successive confirmation count model, and results in:

$$\overline{N}_{th} = 11 \tag{2}$$

The selection of eleven successive period oscillation confirmation counts ensures that the CDA will not generate the instability signal inadvertently during normal operation. The probability for a single neutron detector 108 sustaining sufficient successive confirmation counts to reach $\overline{N}_{th}$ during normal operation is:

$$P_{\overline{N}_{th}} = \left(\frac{1}{10}\right)^8 \times \left(\frac{1}{2}\right)^8 / (5 \text{ seconds}) < 10^{-11}/\text{second}$$

Therefore the probability of a large number of neutron detectors 108 simultaneously reaching $\overline{N}_{th}$ spuriously during the operating life of reactor 100 is exceedingly small. The choice of this setpoint for the instability threshold confirmation count also assures that the CDA will quickly generate the instability signal when presented with fast instability transients. The PBA generates eleven consecutive confirmations in approximately 5.3 oscillation periods following the recognition of an oscillation base-period. Since reactor 100 is not anticipated to instantaneously transition to the unstable mode, the CDA response time assures adequate protection of the fuel safety limits.

An instability threshold flag, $S_{th}^i$, is introduced to indicate the status of the successive confirmation count of the each neutron detector 108 relative to the instability threshold confirmation count ($\overline{N}_{th}$). The instability threshold flag is defined as:

$$S_{th}^i = \begin{cases} 0 & N_i < \overline{N}_{th} \\ 1 & N_i \geq \overline{N}_{th} \end{cases} \tag{3}$$

where $N_i$ is successive confirmation count for each neutron flux detector 108 output signals and $\overline{N}_{th}$ is the instability threshold confirmation count.

The confirmation density, which represents a fraction of active neutron detectors 108 exhibiting successive confirmation counts that are at or above the instability threshold confirmation count ($\overline{N}_{th}$), is expressed as:

$$CD = \frac{\sum_{i=1}^{n} S_{th}^i}{M} \tag{4}$$

where M is number of active neutron detectors 108 in core 106. Reactor is defined to be at the instability threshold when:

$$CD \geq S_{CD} \tag{5}$$

The confirmation density setpoint ($S_{CD}$) is established and defined to be the confirmation density value for which the instability signal is generated. The setpoint is selected to ensure that a significant number of neutron detectors 108 exceed the instability threshold confirmation count, and that a sufficient representative sample of neutron detectors 108 are available for interrogation. A maximum permissible confirmation density setpoint is illustrated in FIG. 4.

An allowable confirmation density setpoint upper bound ($S_{CD}^{max}$) is given by:

$$S_{CD}^{max} = (1-E) \times F_{CD}^{max} \tag{6}$$

where E is defined to be an axial loss of PBA efficiency. A maximum response fraction, $F_{CD}^{max}$, is defined to be a bounding maximum fraction of neutron detectors 108 that reach the instability threshold confirmation count at point of instability inception. The values of E and $F_{CD}^{max}$ are selected to establish a permissible maximum value for the confirmation density setpoint. E is generically set to 0.25, corresponding to the conservative assumption that the PBA is completely unresponsive to the D level neutron detectors 108.

The value of $F_{CD}{}^{max}$ is dependent on the mode of the power oscillations present in core 106, and a regional mode oscillation is conservatively selected as the limiting core behavior with respect to the CDA performance. Neutron detectors 108 near the axis of symmetry can detect oscillations that are completely out of phase with the local thermal-hydraulic response. This condition is incompatible with the requirements of the PBA to discern successive confirmation counts. The size of the affected core area is governed by the neutron mean free path. Since the high void region of core 106 is already addressed by E and can therefore be discounted, a mean free path of ten inches for lower void core regions is appropriately conservative. Selection of a corresponding no-response zone width equivalent to three mean free paths on each side of the axis of symmetry provides 95% attenuation of neutron flux from across the axis of symmetry, and bounds those neutron detectors that may be affected by neutrons from an opposite oscillation phase. By conservatively bounding the smallest reactor design, for example General Electric BWR/3, with an eleven foot diameter core, maximum response fraction, $F_{CD}{}^{max}$, for bounding assumptions described above is determined. Assuming an approximately even neutron detector 108 distribution in core 106, $$F_{CD}{}^{max}=0.44 \tag{7}$$

A value of $S_{CD}{}^{max}$, as given by Equation 8, is now determined:

$$S_{CD}{}^{max}=0.33 \tag{8}$$

An actual setpoint must be selected at or below $S_{CD}{}^{max}$ to ensure proper operation of the CDA.

A permissible minimum confirmation density setpoint, $S_{CD}{}^{min}$, can also be established for $S_{CD}$. However, the minimum permissible value is not bounded by safety considerations. Instead, as $S_{CD}$ decreases, the required number of neutron detectors 108 reaching the instability threshold confirmation count needed to generate a reactor scram becomes smaller. As a result, the CDA may become sensitive to the characteristics of the instability threshold specific to a particular event. This condition could potentially lead to premature generation of the instability signal. To conservatively preclude this type of spurious actuation, a minimum number of neutron detectors 108 are required to reach the instability threshold confirmation count before the CDA generates the instability signal. A reasonable minimum number of responding neutron detectors 108 is chosen to be thirty. This corresponds to the minimum confirmation density setpoint, $S_{CD}{}^{min}$:

$$S_{CD}{}^{min}=0.20 \tag{9}$$

The confirmation density setpoint for a particular application may therefore range between $0.20 \leq S_{CD} \leq 0.33$. The plant-specific setpoint will be selected between lower and upper bounds, $S_{CD}{}^{min}$ and $S_{CD}{}^{max}$, to maximize trip signal reliability and to avoid the possibility of exceeding the maximum number of responsive neutron detectors 108. A reasonable choice for the confirmation density setpoint is $S_{CD}=0.30$. This selection corresponds to approximately forty neutron detectors, exceeding the instability threshold confirmation count.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A power oscillation monitoring system for detection and indication of instability of a nuclear reactor having a plurality of fuel bundles and a plurality of neutron flux detectors for generating a plurality of respective output signals indicative of thermal-hydraulic oscillation frequencies of the fuel bundles, said system comprising a processor programmed to:

(a) determine an instability threshold confirmation count based on the neutron flux detector output signals utilizing a period-based algorithm, determining the instability threshold confirmation count comprises generating an instability threshold flag $S^i_{th}$ determined in accordance with the following function:

$$S^i_{th} = \begin{cases} 0 & N_i < \overline{N}_{th} \\ 1 & N_i \geq \overline{N}_{th}; \end{cases}$$

(b) determine a confirmation density based on the instability threshold confirmation count utilizing a confirmation density stability algorithm; and (c) generate a thermal-hydraulic instability signal when the confirmation density reaches a predetermined level.

2. A power oscillation monitoring system in accordance with claim 1 wherein the period-based algorithm is tuned based on a successive confirmation count model.

3. A power oscillation monitoring system in accordance with claim 1 wherein the neutron flux detectors are local power range monitors.

4. A power oscillation monitoring system in accordance with claim 1 wherein the confirmation density is a fraction wherein a denominator is the number of active neutron detector output signals and a numerator is the number of active neutron flux detector output signals that exceed a target successive oscillation period confirmation count.

5. A power oscillation monitoring system in accordance with claim 1 wherein the instability signal has a first state and a second state, and the signal remains in the first state until the confirmation density exceeds the a confirmation density setpoint.

6. A power oscillation monitoring system in accordance with claim 1 wherein the confirmation density is determined in accordance with the following function:

$$CD = \frac{\sum_{i=1}^{n} S^i_{th}}{M}$$

where M is the number of active neutron flux detectors in the core and $S_{th}{}^i$ is the instability threshold flag.

7. A power oscillation monitoring system in accordance with claim 1 wherein the instability threshold confirmation count $\overline{N}_{th}$ is equal to 11.

8. A power oscillation monitoring system in accordance with claim 1 wherein a maximum confirmation density setpoint is determined in accordance with the following function:

$$S^{max}{}_{CD}=(1-E) * F_{CD}{}^{max}$$

where E is an axial loss of period based algorithm efficiency, and $F^{max}{}_{CD}$ is a bounding maximum fraction wherein the denominator is the number of active neutron detector output signals and the numerator is the number of active detector output signals that equal or exceed the instability threshold confirmation count.

9. A power oscillation monitoring system in accordance with claim 8 wherein the axial loss of period based algorithm efficiency is equal to 0.25.

10. A power oscillation monitoring system in accordance with claim 8 wherein the maximum confirmation density setpoint is in the range of approximately 0.2 to 0.33.

11. A method for indicating instability of a nuclear reactor using a power oscillation monitoring system, the reactor having a core including a plurality of fuel bundles and a plurality of neutron flux detectors, the flux detectors distributed throughout the core contiguous the fuel bundles, each of the neutron detector providing an output signal being indicative of thermal-hydraulic oscillation frequencies of the fuel bundles, the system having a processor, said method comprising the steps of:
   (a) determining an instability threshold confirmation count based on the neutron flux detector output signals utilizing a period-based algorithm;
   (b) determining a confirmation density based on the instability threshold confirmation count utilizing a confirmation density stability algorithm, determining the confirmation density comprises the step of generating an instability threshold flag status $S^i{}_{th}$ for each of the neutron flux detector output signals in accordance with the following function:

$$S^i_{th} = \begin{cases} 0 & N_i < \overline{N}_{th} \\ 1 & N_i \geq \overline{N}_{th} \end{cases} ; \text{ and}$$

(c) generating a thermal-hydraulic instability signal when the confirmation density reaches a predetermined level.

12. A method in accordance with claim 11, wherein the periodic based algorithm is tuned based on a successive confirmation count model.

13. A method in accordance with claim 11, wherein the step of generating a confirmation density is determined in accordance with the following function:

$$CD = \frac{\sum_{i=1}^{n} S^i_{th}}{M}$$

where M is the number of active neutron flux detectors in the core and $S^i{}_{th}$ is the instability threshold flag status for each of the neutron flux detectors.

14. A method in accordance with claim 11, wherein generating an instability signal further comprises the step of comparing the confirmation density to a predetermined level in accordance with the following function:.

$$CD >= S_{CD}{}^{max}$$

15. A method in accordance with claim 11, wherein the maximum confirmation density setpoint $S_{CD}{}^{max}$ is in the range 0.2 to 0.33.

16. A method in accordance with claim 11 wherein the instability threshold confirmation count $\overline{N}_{th}$ is equal to 11.

17. A method in accordance with claim 11 wherein determining a confirmation density further comprises the step of determining a maximum confirmation density setpoint in accordance with the following function:

$$S^{max}{}_{CD} = (1-E) * F_{CD}{}^{max}$$

where E is an axial loss of period based algorithm efficiency, and $F^{max}{}_{CD}$ is a bounding maximum fraction wherein the denominator is the number of active neutron detector output signals and the numerator is the number of active detector output signals that equal or exceed the instability threshold confirmation count.

18. A method in accordance with claim 17 wherein the axial loss of period based algorithm efficiency is equal to 0.25.

* * * * *